(No Model.) 2 Sheets—Sheet 1.
S. G. GOSS.
ADJUSTABLE FORM TABLE.

No. 432,034. Patented July 15, 1890.

Witnesses

Inventor
Samuel G. Goss (No Model.) 2 Sheets—Sheet 2.
S. G. GOSS.
ADJUSTABLE FORM TABLE.
No. 432,034. Patented July 15, 1890.
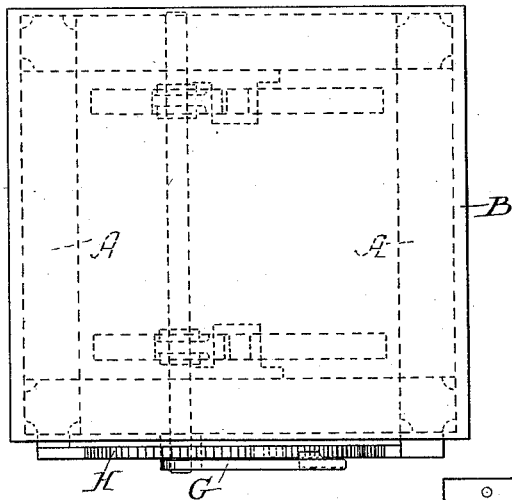
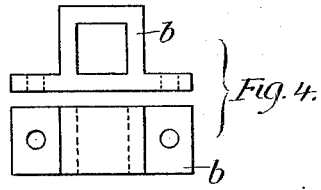
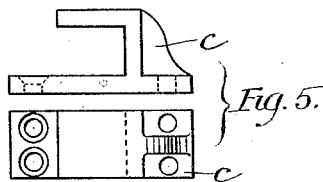
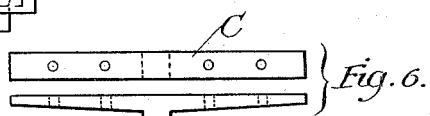
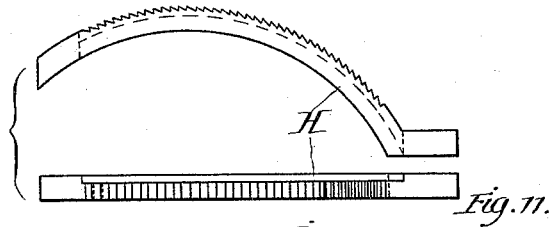
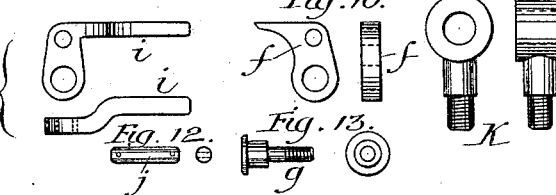
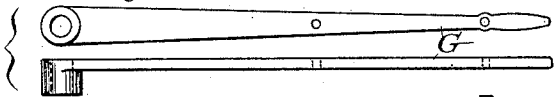
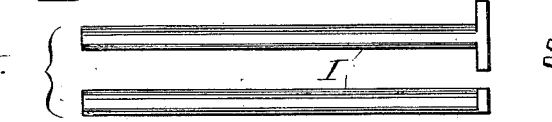
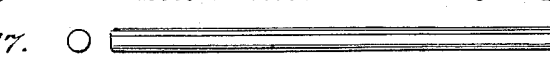
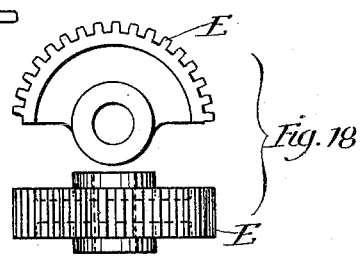
Witnesses
Inventor
Samuel G. Goss.

UNITED STATES PATENT OFFICE.

SAMUEL G. GOSS, OF CHICAGO, ILLINOIS, ASSIGNOR TO THE GOSS PRINTING PRESS COMPANY, OF SAME PLACE.

ADJUSTABLE FORM-TABLE.

SPECIFICATION forming part of Letters Patent No. 432,034, dated July 15, 1890.

Application filed August 17, 1889. Serial No. 321,173. (No model.)

*To all whom it may concern:*

Be it known that I, SAMUEL G. GOSS, residing at Chicago, in the county of Cook and State of Illinois, and a citizen of the United States, have invented a new and useful Improvement in Adjustable Form-Tables, of which the following is a specification, reference being had to the accompanying drawings, in which—

Figure 1:
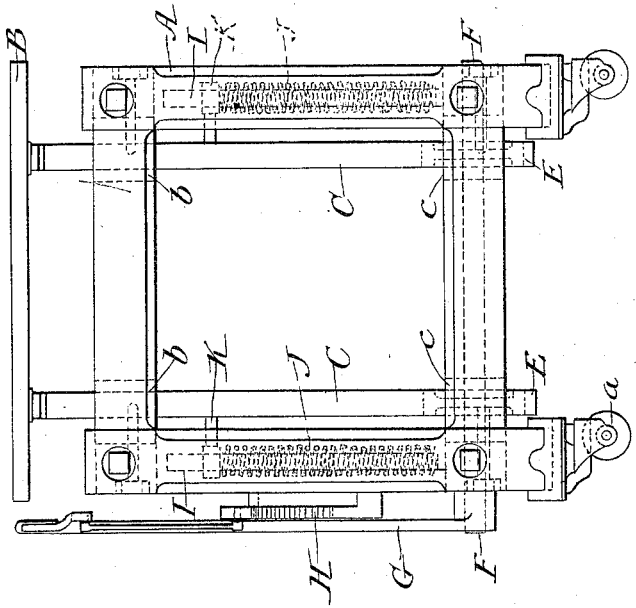
Figure 2:
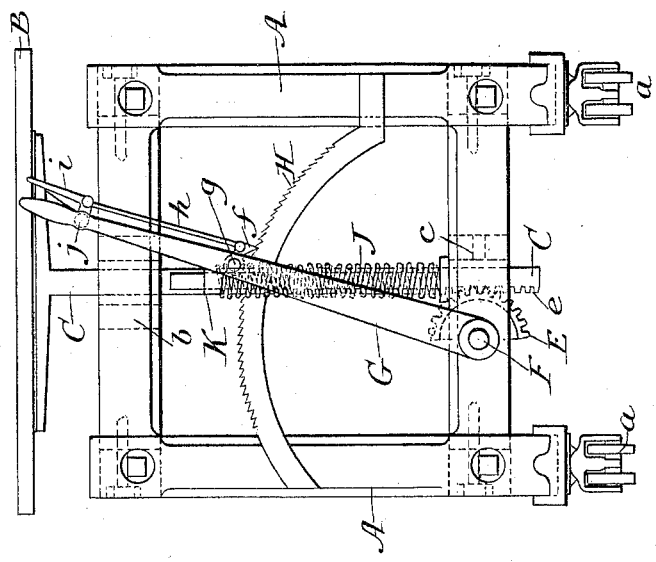

Figure 1 is an end elevation. Fig. 2 is a side elevation. Fig. 3 is a top or plan view. Figs. 4 to 18, inclusive, are details, which are hereinafter explained.

The object of this invention is to provide a novel table on which printing-forms may be made up and which can be adjusted vertically to correspond to the height of the press or table to or from which the form is to be transferred, so that the form can be readily slid from the table to the press or from the press to the table, which I accomplish as illustrated in the drawings, and as hereinafter described.

That which I claim as new will be pointed out in the claims.

In the drawings, A represents the frame of the table. This frame A is supported upon casters $a$, as shown in Figs. 1 and 2.

B represents the movable plate of the table. This plate B is supported upon two standards C, one on each side about the middle of the length of the table, as shown in Figs. 1 and 2. Each standard C is supported at its upper end in a vertical guide $b$, which is secured to the frame A, and at its lower end passes through a vertical guide $c$, also secured to the frame A. Each standard C at its lower end is provided with a rack $e$, each of which racks $e$ is engaged by a geared segment E, which segments E are secured on a rock-shaft F. The rock-shaft may be supported in any suitable bearings on the frame A.

G is a hand-lever secured on the outer end of the shaft F, as shown in Figs. 1 and 2. This lever G is provided with a pawl $f$, which is pivoted to the lever G on a pivot $g$, and is pivotally connected with a rod $h$, which at its upper end is pivotally connected to an elbow-lever $i$, which is pivoted to the upper end of the lever G on a pivot $j$.

H is a ratchet-segment, with which the pawl $f$ can engage and which is secured to the end of the frame A.

I I are two uprights secured in the frame A, each of which is surrounded by coiled spring J, as shown in Fig. 1.

K K are two eyebolts, one secured in each standard C. Each upright I passes through the eye of one of these bolts K, as shown in Fig. 1. The springs J press upward on the eyebolts K, partly counterbalancing the weight of the plate B and standards C.

The lower guides $c$ for the standards C are open on one side, so as not to interfere with the segments E.

When a form is made up on the plate B and it is desired to transfer it to the bed of the press or to another table, the plate B may be raised or lowered to bring it to the proper height by means of the lever G, which rocks the shaft F and segments E, which engage with the rack $e$ on the standards C. The plate is held at any height by the pawl $f$ and ratchet-segment H.

The table may be used in transferring the forms from one table to another or to a press or from a press to a table. In either case the plate B may be raised or lowered, so that it will be on a level with the table or press to or from which the form is being transferred, permitting the form to be slid from one to the other.

What I claim as new, and desire to secure by Letters Patent, is—

1. A printing-form table consisting of a frame A, having guides $b$, the movable plate B, located wholly above the upper end of the frame and having attached thereto a pair of depending standards C sliding through said guides and each having a rack $e$, a rock-shaft F, journaled on the frame, having at one end a lever G and provided with a pair of segmental gears E, respectively engaging the racks on the standards of the movable plate, and coiled springs J, acting, respectively, on the standards to partly counterbalance the weight of the latter and of the movable plate, substantially as described.

2. A printing-form table consisting of a frame A, having the upper and lower guides $b$ and $c$, the movable plate surmounting the frame and having a pair of depending standards C sliding through the upper and lower guides and each provided with a rack $e$, a rock-shaft F, journaled on the frame and having a pair of segments E, respectively engaging the racks on the standards of the movable plate, a lever G, secured to the rock-shaft and having a spring-pawl f, and the ratchet-segment H, secured to the frame for holding the movable plate at different heights above the frame, substantially as described.

3. A printing-form table consisting of a frame A, having guides b, the movable plate B, having a pair of depending standards C sliding through the guides and each having an eyebolt K, the uprights I, secured to the frame and passing through the eyebolts, the springs J, arranged, respectively, on the uprights and supporting the eyebolts, and lever mechanism connected with the standards for raising and lowering the same to adjust the movable plate above the frame, substantially as described.

4. A printing-form table consisting of a frame A, having guides b, the movable plate B, having a pair of attached depending standards C sliding through the guides and each having an eyebolt K, and a rack e, the uprights I, secured to the frame and passing through the eyebolts, the springs J, arranged on the uprights and supporting the eyebolts, and the rock-shaft F, journaled on the frame and provided with a hand-lever G, and a pair of segments E, respectively engaging the racks on the standards, substantially as described.

SAMUEL G. GOSS.

Witnesses:
HARRY T. JONES,
ALBERT H. ADAMS.